(12) United States Patent
Van Gundy (10) Patent No.: US 8,335,209 B2
(45) Date of Patent: Dec. 18, 2012

(54) GROUP PAGING SYNCHRONIZATION FOR VOIP SYSTEM

(75) Inventor: Scott A. Van Gundy, Los Gatos, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 1096 days.

(21) Appl. No.: 12/054,854

(22) Filed: Mar. 25, 2008

(65) Prior Publication Data

US 2009/0245232 A1 Oct. 1, 2009

(51) Int. Cl.
H04L 12/66 (2006.01)

(52) U.S. Cl. .................. 370/352; 370/260; 370/356

(58) Field of Classification Search ............ 379/202.01, 379/420.01, 88.17, 88.22; 370/286, 352, 370/230, 260, 356; 709/233, 231, 204; 455/412.1, 455/518, 458, 464; 705/14; 726/11
See application file for complete search history.

(56) References Cited

U.S. PATENT DOCUMENTS

| | | | |
|---|---|---|---|
| 6,061,440 A * | 5/2000 | Delaney et al. .......... 379/202.01 |
| 6,668,167 B2 * | 12/2003 | McDowell et al. ........ 455/412.1 |
| 6,850,496 B1 * | 2/2005 | Knappe et al. ................ 370/260 |
| 6,996,059 B1 | 2/2006 | Tonogai |
| 7,003,091 B1 | 2/2006 | Burns et al. |
| 7,167,486 B2 | 1/2007 | Cornelius et al. |
| 7,194,084 B2 * | 3/2007 | Shaffer et al. ............ 379/420.01 |
| 7,379,540 B1 | 5/2008 | Van Gundy |
| 7,386,114 B1 | 6/2008 | Robesky |
| 7,529,200 B2 * | 5/2009 | Schmidt et al. ............... 370/260 |
| 7,599,355 B2 * | 10/2009 | Sunstrum ...................... 370/352 |
| 7,716,725 B2 * | 5/2010 | Xie ................................. 726/11 |
| 2002/0075818 A1 * | 6/2002 | Matsuo ......................... 370/286 |
| 2002/0085538 A1 * | 7/2002 | Leung ........................... 370/352 |
| 2002/0087711 A1 * | 7/2002 | Leung ........................... 709/233 |
| 2003/0091000 A1 * | 5/2003 | Chu et al. ...................... 370/230 |
| 2003/0158957 A1 * | 8/2003 | Abdolsalehi ................. 709/231 |
| 2005/0157708 A1 * | 7/2005 | Chun ............................ 370/356 |
| 2005/0169443 A1 * | 8/2005 | Rosenthal ................. 379/88.17 |
| 2005/0278424 A1 * | 12/2005 | White ........................... 709/204 |
| 2006/0019681 A1 * | 1/2006 | Harris et al. .................. 455/464 |
| 2006/0189337 A1 * | 8/2006 | Farrill et al. .................. 455/518 |
| 2006/0233340 A1 | 10/2006 | Tovino et al. |
| 2007/0171098 A1 | 7/2007 | Basart et al. |
| 2007/0217589 A1 * | 9/2007 | Martin et al. ............ 379/202.01 |
| 2008/0010163 A1 | 1/2008 | Kish |
| 2008/0070594 A1 * | 3/2008 | Barber ......................... 455/458 |
| 2008/0205605 A1 * | 8/2008 | Gao et al. ................... 379/88.22 |
| 2008/0262911 A1 * | 10/2008 | Altberg et al. .................. 705/14 |
| 2012/0027008 A1 * | 2/2012 | Chou ............................ 370/352 |

* cited by examiner

*Primary Examiner* — Ricky Ngo
*Assistant Examiner* — Parth Patel
(74) *Attorney, Agent, or Firm* — Kilpatrick Townsend & Stockton LLP (57) ABSTRACT

This invention overcomes the problem of delay associated with establishing connections with individual phones by providing a method for sending a virtual real time voice message processed through a VOIP system to a group of phones concurrently. The method includes assembling a portion of the voice message. The voice message includes a voice portion and an address portion. The voice portion of the voice message is buffered in a digital buffer. The address portion is used to determine the address of each phone in the group. After the address of each phone in the group is determined, an attempt is made to establish a connection with each phone. The method further includes waiting for a period of time. The period of time is determined based at least in part on a time duration required to establish a connection with a phone. After waiting the period of time, the voice portion of the voice message is sent to at least one phone in the group of phones.

22 Claims, 4 Drawing Sheets

GROUP PAGING SYNCHRONIZATION FOR VOIP SYSTEM

BACKGROUND OF THE INVENTION

Voice over Internet Protocol (VoIP) involves the routing of voice conversations over the Internet or other packet switched networks. Calls can be made over the Internet using an IP phone, which is a phone that uses VoIP technology. VoIP provides a secure form of communication by using existing encryption and authentication protocols, such as the Secure Real-time Transport Protocol (SRTP). Most of the difficulties of creating a secure communication over traditional phone lines, like digitizing and digital transmission, are already in place with VoIP. Only the additional steps of encrypting and authenticating the existing data stream are required.

VoIP networks are increasingly used as alternatives to the public switched telephone network (PSTN). VoIP systems allow companies to extend communications services to all employees, whether they are in office headquarters, at branch offices, working remotely, or even working mobile. Also, being software based, VoIP systems are highly scalable. A typical VoIP system, for example, can handle anywhere between 1 and 10,000 users. VoIP's scalability is especially useful for fast-growing companies or those that must respond quickly to changes in demand.

Another benefit of being software based is that most VoIP systems include features for which telecommunications companies using the public switched telephone network (PSTN) normally charge extra. Some examples include 3-way calling, call forwarding, automatic redial, caller ID, call waiting, voice mail, conference calling, call transfer, and others. In addition, some VoIP providers offer features that are not available from traditional telecommunications companies. For example, a general purpose desktop computer, or soft phone, may be used to make telephone calls over the Internet. Also, some VoIP providers offer a "soft" client that allows a user to control calls from a desktop computer. Such a system includes the ShoreTel Personal Call Manager from ShoreTel, Inc. of Sunnyvale, Calif. These are just some of the unique features that providers of VoIP systems can offer.

Despite the array of features possible from a VoIP system, there are often challenges in incorporating even those features that are common with the features offered by traditional telecommunications companies. A simple example is making emergency phone calls. With the mobility enabled by being Internet-based, it may not be possible to determine the geographic location of a user in a VoIP system. If a caller's geographic location can not be determined, emergency phone calls cannot be routed to nearby call centers. Another example is sending faxes. Existing voice codecs are not designed for fax transmission.

Yet another feature that may not incorporate seamlessly into a VoIP system is overhead paging. An overhead paging system is often used in large department stores to "page" employees or in airports to make announcements. Traditionally, these systems included an analog phone with the speaker wired directly to the various speakers of the system. A person uses such a system by dialing the number of the phone, the phone auto-answers, and when the person talks his or her voice is broadcast over the speakers of the system.

Overhead paging can be incorporated into a VoIP system in a manner analogous to that of a traditional overhead paging system, by using an IP phone or soft phone with the speaker wired directly to the various speakers of the system.

VoIP systems, however, offer other advantages. For example, VoIP systems can play a voice message over the speakers of a group of IP phones or soft phones without requiring anyone to take the phones offhook. This allows a voice message to be sent concurrently to users at different locations, and is not limited by the range of the speakers wired to the system. A voice message can be delivered through the speakers of phones in different buildings that may be in different parts of the country. Further, some VoIP systems allow users to create custom groups of phones to which voice messages are sent. For example, a company with several different departments may create a custom group for voice messages that are sent to one department, another custom group for voice messages that are sent to a particular combination of departments, another custom group for voice messages that are sent to all departments, and so on.

However, there are challenges to realizing these benefits. For example, playing a voice message over the speakers of individual phones requires that a connection be established with each phone. Differences in the time it takes to establish each connection results in the message playing from phones at different times. If the phones are in close proximity to one another, a listener may experience an echo. An echo results when the sound comes from the speakers of different phones at different times. Echo can make voice messages difficult to understand.

Traditional overhead paging systems did not have a problem with echo because the speakers of the system were wired directly to a single phone. In terms of listener perception, messages were delivered from the various speakers at the same time. However, delays are more likely in VoIP systems since they rely on packet switched networks to setup connections with each phone. Despite the additional features enabled by a VoIP system, users require the basic functionality of the system to be at least equal to traditional systems. Like traditional overhead paging systems, VoIP systems must deliver voice messages such that any delay is unperceivable. At least to human perception, the message being played from the different phones must be synchronized.

One method that has been used to ensure that voice messages processed through VoIP systems are synchronized is to record the messages and delay sending them until after the entire message is recorded. However, this solution is unsatisfactory to users who generally want their voice messages to be played virtually real time.

Thus, there is a general need in the art for an improved method and apparatus for playing voice messages that are processed through a VoIP system.

BRIEF SUMMARY OF THE INVENTION

This invention overcomes the problem of delay associated with establishing connections with individual phones by providing a method for sending a virtual real time voice message processed through a VOIP system to a group of phones concurrently. The method includes assembling a portion of a voice message. The voice message includes a voice portion and an address portion. The voice portion of the voice message is buffered in a digital buffer. The address portion is used to determine the address of each phone in the group. After the address of each phone in the group is determined, an attempt is made to establish a connection with each phone in the group. The method further includes waiting for a period of time. The period of time is determined based at least in part on a time duration required to establish a connection with a phone. After waiting the period of time, the voice portion of the voice message is sent to at least one phone in the group of phones.

The period of time may be a set time period, or a time delay required to establish a connection with each phone in the group. Alternatively, the time period may be a time delay required to establish a connection with each phone in the group, unless the connections are not established within a set time period, in which case the period of time is the set time period. Typically, the period of time will be substantially shorter than the voice message (e.g. less than a second).

The voice portion of the voice message may be sent to the phones in the group with established connections. Alternatively, the voice portion of the voice message may be sent to each phone in the group, including those without established connections. In this case, the phones without established connections may store the voice message for later playback.

A further understanding of the nature and advantages of the present invention may be realized by reference to the remaining portions of the specification and the drawings.

DETAILED DESCRIPTION OF THE INVENTION

Figure 1:
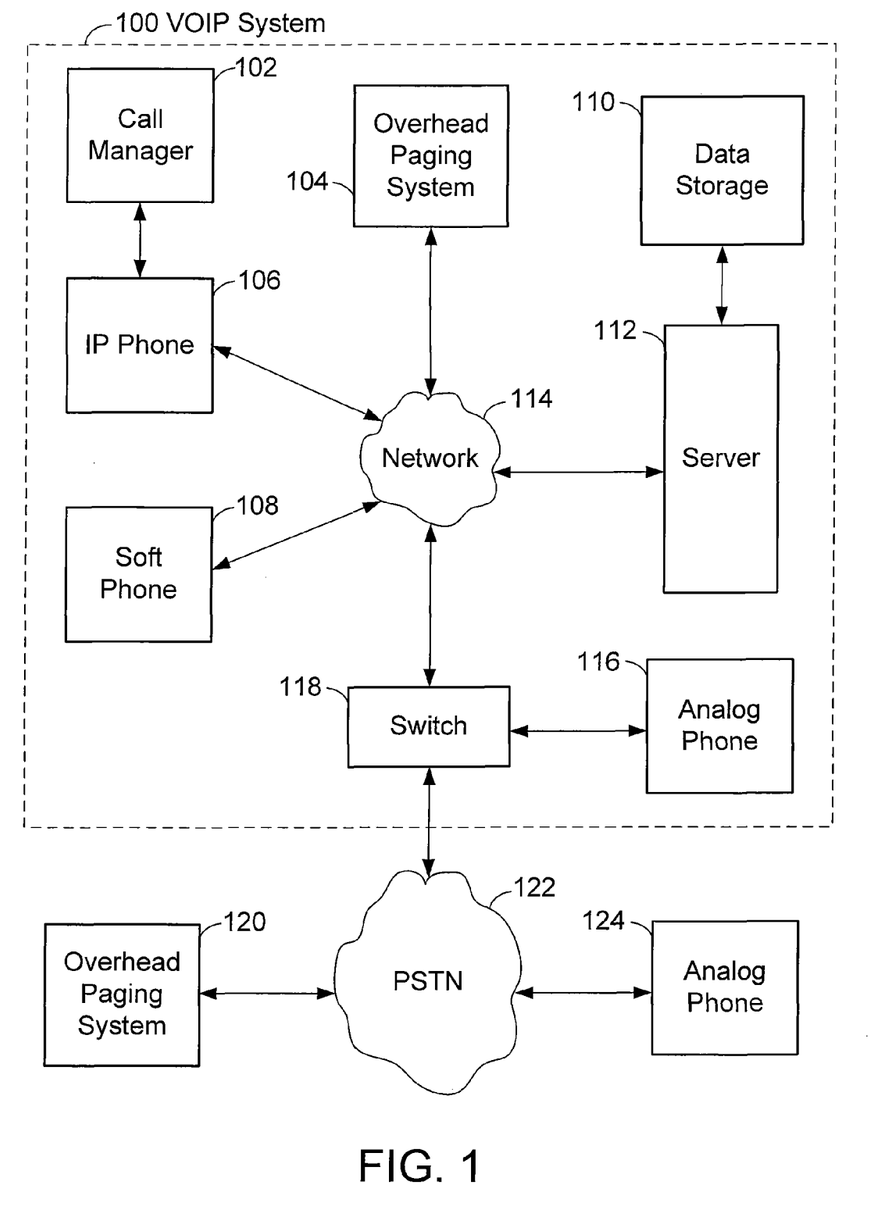
FIG. 1 illustrates a block diagram of a VoIP system according to an embodiment of the present invention.

FIG. 1 illustrates a block diagram of a VoIP system according to an embodiment of the present invention. In the example of FIG. 1, VoIP system 100 includes network 114 linked with PSTN 122 by switch 118. Network 114 may be the Internet or any other packet switched network over which VoIP system 100 operates. The telephone service carried by PSTN 122 is often referred to as plain old telephone service (POTS). As shown in FIG. 1, switch 118 acts as a gateway between VoIP system 100 and PSTN 122. Calls entering or leaving VoIP system 100 are routed through switch 118. Further, switch 118 serves to manage calls within VoIP system 100. All calls that originate within VoIP system 100 may be managed by switch 118, even those that are completely internal to the system (from one communications device to another communications device within VoIP system 100).

FIG. 1 shows IP phone 106, soft phone 108, overhead paging system 104, and analog phone 116. IP phone 106, soft phone 108, and overhead paging system 104 are linked directly with network 114. Analog phone 116 is linked with network 114 through switch 118. These devices are illustrated merely as examples of some of the devices that may be used to communicate using VoIP system 100. Also shown is call manager 102. In some embodiments, call manager 102 is not considered a separate communications device, but is linked with IP phone 106 to provide an enhanced user interface and increased functionality. As such, call manager 102 may be a desktop computer running a management utility software application, for example the "soft" client discussed previously. In other embodiments, call manager 102 and IP phone 106 may be linked through network 114 and server 112. In this configuration, call manager 102 may provide the same enhanced user interface and increased functionality despite no direct link with IP phone 106.

IP phone 106 allows a user to make telephone calls over network 114. IP phone 106 may be a simple software-based device, or a more complex device that may include programmable buttons and a graphical user interface. In either case, IP phone 106 conveys data through a speaker and receives data through a microphone. IP phone 106 may also receive data through a keypad, touch screen, or other input device.

Soft phone 108 may be a general purpose desktop computer with software for making telephone calls over network 114. Similar to IP phone 106, soft phone 108 conveys data through a speaker and receives data through a microphone. Soft phone 108 may also receive data through a keyboard, pointing device such as a mouse, touch screen, or the like.

VoIP system 100 may include overhead paging system 104. Such an overhead paging system may include a variety of configurations. For example, overhead paging system 104 may be configured similar to a traditional overhead paging system, with the speaker of the phone wired directly to the various speakers of the system. In this case, the primary difference would be the use of an IP phone or a soft phone rather than an analog phone. Alternatively, each speaker of overhead paging system 104 may be associated with an individual IP phone or soft phone. In this case, the individual phones may be mounted overhead as part of a paging system. As yet another possible configuration, overhead paging system 104 may include IP phones or soft phones distributed throughout an office or across a VoIP network. In this case, the phones may be the phones of individual users. In any case, overhead paging system 104 conveys data through a speaker. Overhead paging system 104 may also receive data through a keypad, touch screen, or other input device, particularly when using the phones of individual users. Other embodiments of the invention may include variations and/or other configurations.

VoIP system 100 may also include analog phone 116. Analog phone 116 is a telephone that is configured to connect to PSTN 122. Switch 118 enables analog phone 116 to be used within VoIP system 100. Analog phone 116 generally conveys data through a speaker and receives data through a microphone and keypad.

VoIP system 100 also includes server 112 linked with network 114. Server 112 may execute the software applications that provide the features of VoIP system 100. Server 112 typically includes familiar server components such as a processor and tangible media for storage, I/O devices, and a system bus interconnecting the components. RAM and disk drives are examples of tangible media for storage of data and computer programs. Other types of tangible media include magnetic storage media, optical storage media, semiconductor memories such as flash memory, networked storage devices, and the like. Further, server 112 includes an operating system. In the embodiment of FIG. 1, server 112 includes a digital buffer for temporarily storing voice messages. In some embodiments, server 112 may include more than one server (e.g. server cluster).

Data storage 110 is linked with server 112. Data storage 110 may be any conventional database such as those powered by My SQL, Oracle, Sybase, or the like. In other embodiments, data storage 110 may be another data source such as an LDAP server. In the present embodiment, data storage 110 is configured to store and maintain data.

The components and devices shown in VoIP system 100 of FIG. 1 may be located centrally at a single building or location, or may be distributed across buildings or sites covering large geographies. In the former case, network 114 may be a local area network (LAN) based on Ethernet technology. In the latter case, network 114 may be a wide area network (WAN). In either case, the basic configuration of VoIP system 100, including the individual components and devices, may be replicated to provide functionality and scalability as required.

Separate from VoIP system 100, FIG. 1 illustrates overhead paging system 120 and analog phone 124 linked with PSTN 122. These devices are illustrated merely as examples of some of the devices that may be used to communicate using PSTN 122. As would be appreciated by one of ordinary skill in the art, many other devices may be used to communicate using PSTN 122. Overhead paging system 120 is generally configured using an analog phone with the speaker wired directly to the various speakers of the system, as discussed previously. Analog phone 124 is a telephone that is configured to connect to PSTN 122. Like analog phone 116 in VoIP system 100, analog phone 124 generally conveys data through a speaker and receives data through a microphone and keypad.

In FIG. 1, communication links between the various components and devices are shown using arrows. These communication links may represent wired or wireless connections. Further, wireless embodiments may be terrestrial or satellite-based. For example, FIG. 1 shows IP phone 106, soft phone 108, and overhead paging system 104 linked directly with network 114. These links may be wired, wireless, or a combination of wired and wireless technologies. Other embodiments of the invention may include variations and/or other configurations.

It is to be understood that VoIP system 100 illustrated in FIG. 1 is presented merely as an exemplary VoIP system to illustrate the features and functionality of the present invention. Not all VoIP systems include the components shown in FIG. 1. Likewise, some VoIP systems include additional components not shown in FIG. 1. VoIP systems may also include numerous configurations. For example, a VoIP system may include more than one switch 118, server 112, and/or data storage 110. In some configurations, the components shown in FIG. 1 may be combined and/or they may provide functionality that is different from that described herein. For example, some configurations may include soft switches that run on server 112 and provide some or all of the functionality of switch 118. In other configurations switch 118 may provide some or all of the functionality of server 112. Additionally, VoIP systems may include many communications devices, such as IP phone 106, soft phone 108, overhead paging system 104, and others. Thus, the present invention can be embodied in many different forms and should not be construed as limited to the embodiments set forth herein.

Embodiments of the present invention overcome the problem of echo when a voice message is processed through a VoIP system and played over the speakers of a group of phones that are in close proximity to each other. The group of phones may include IP phone 106, soft phone 108, overhead paging system 104, analog phone 116, overhead paging system 120, and/or analog phone 124. Embodiments of the invention enable voice messages processed through a VoIP system to be sent concurrently to a group of phones and played over the speakers of the phones virtually real time. Rather than storing a voice message for later transmittal, messages are buffered and delivered immediately upon establishing a connection with each phone in the group or after a set period of time. Establishing a connection with each phone includes each phone going offhook.

Figure 2:
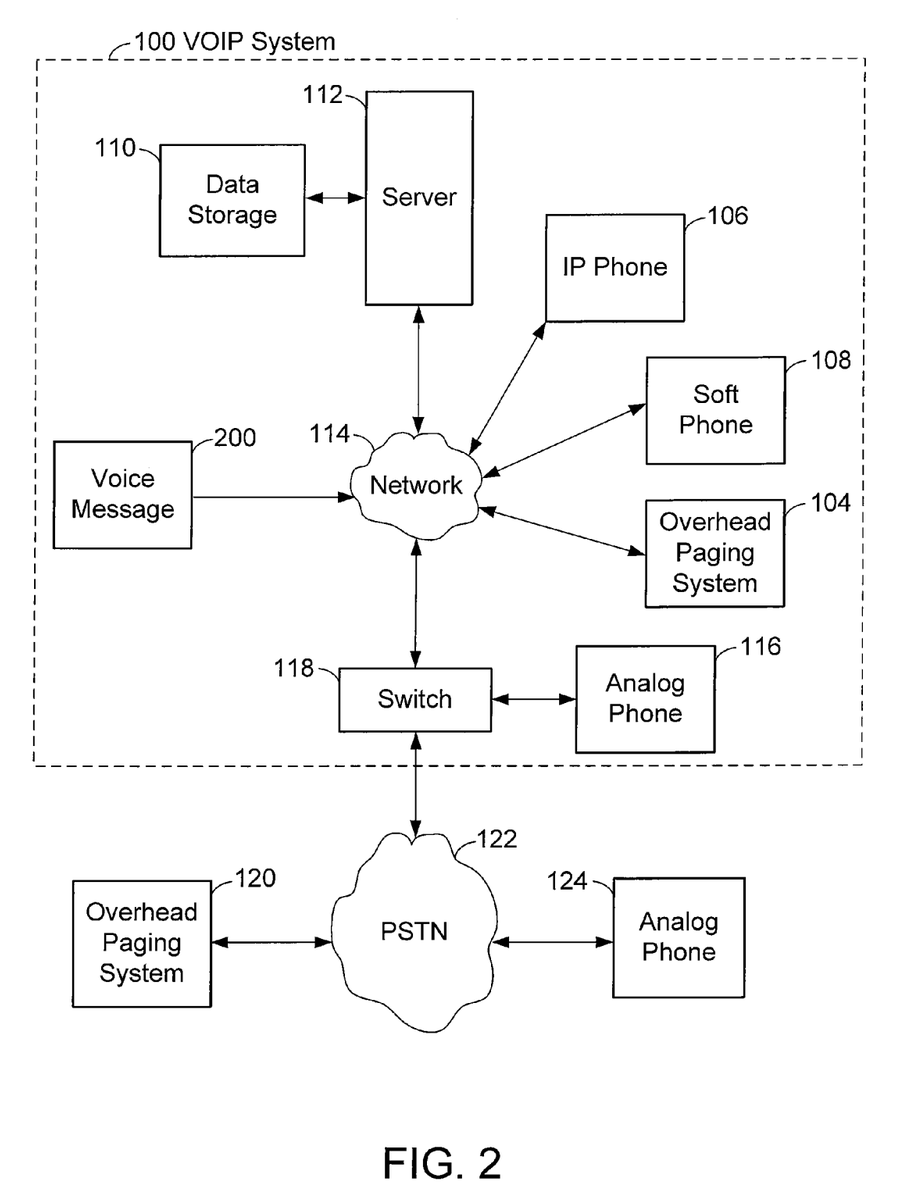
FIG. 2 illustrates a block diagram of a VoIP system according to an embodiment of the present invention.

FIG. 2 illustrates a block diagram of a VoIP system according to an embodiment of the present invention. VoIP system 100 shown in FIG. 2 includes some of the same components and devices of FIG. 1, but they are arranged to more clearly show voice message 200. Voice message 200 represents a message that is to be processed through VoIP system 100 and sent to a group of phones concurrently. For ease of illustration, voice message 200 is shown as being transmitted to network 114. Voice message 200 may originate as a message transmitted from any of the communications devices of VoIP system 100, including IP phone 106, soft phone 108, or analog phone 116. Additionally, although not illustrated in FIG. 2, voice message 200 may originate as a message from any of the communications devices linked to PSTN 122, including analog phone 124.

It is to be understood that voice message 200 is not limited strictly to voice media. Embodiments of the present invention may be utilized in sending voice, video, text, or other media. In addition, embodiments of the invention are not limited to real time messages, but may be utilized to send saved messages or other audible messages processed through VoIP system 100 and sent to a group of phones concurrently.

The group of phones to which voice message 200 is to be sent may include only devices within VoIP system 100, only devices linked with PSTN 122, and/or a combination of such devices. Further, the group of phones is not limited to telephones but may include any type of communications device.

Figure 3:
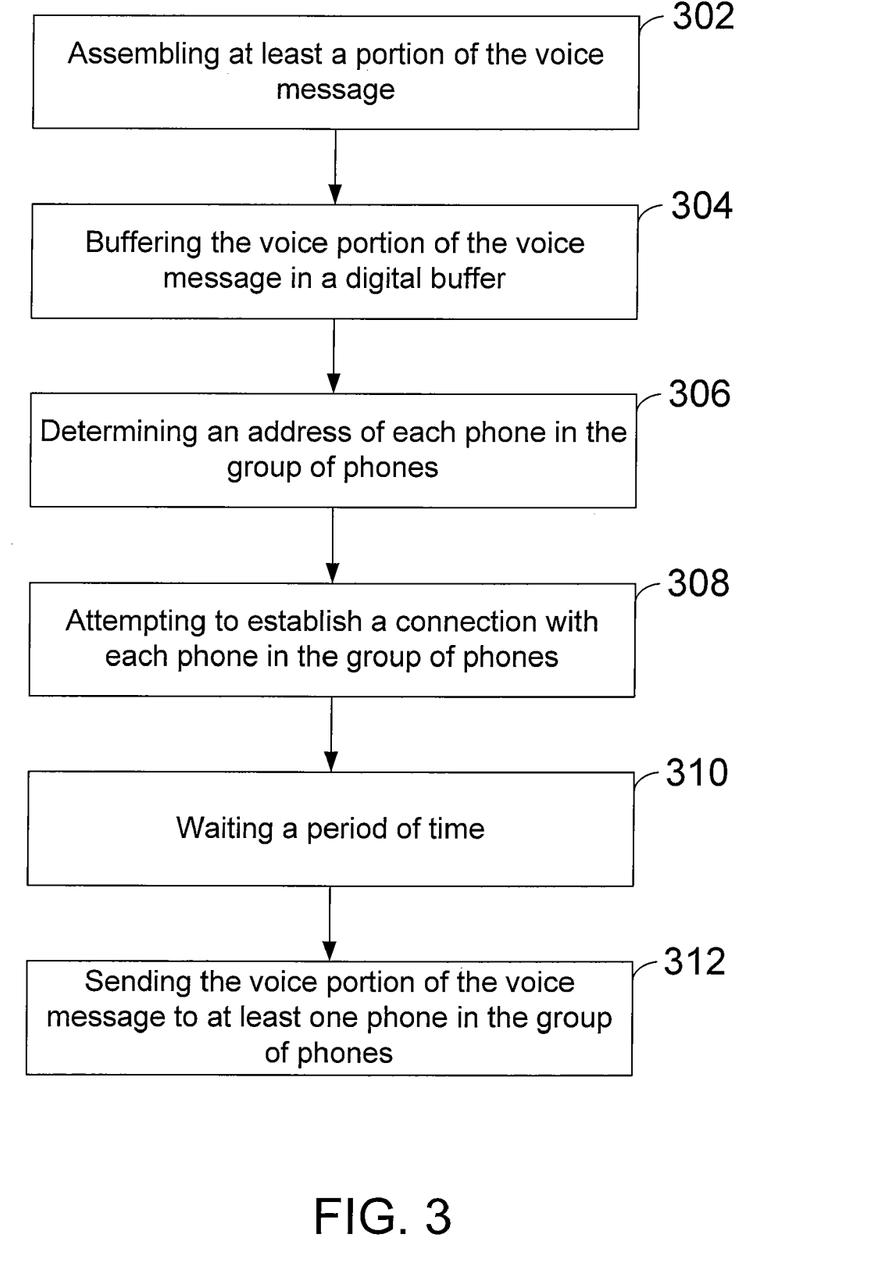
FIG. 3 is a simplified flowchart illustrating a method for sending a virtual real time voice message processed through a VoIP system to a group of phones concurrently, according to an embodiment of the present invention.

FIG. 3 is a simplified flowchart illustrating a method for sending a virtual real time voice message processed through a VoIP system to a group of phones concurrently, according to an embodiment of the present invention. Voice message 200 is encoded in packets and routed across network 114 to server 112. In step 302 of FIG. 3, server 112 assembles at least a portion of voice message 200. Assembling voice message 200 includes determining a voice portion and an address portion. The voice portion includes the data of the voice message that is being transmitted. The address portion includes information for determining the address, or phone number, of each phone to which the message is being sent.

In step 304, server 112 buffers the voice portion of voice message 200 in a digital buffer. Here, a digital buffer is memory that is capable of temporarily storing the voice portion of voice message 200. Alternatively, the voice portion of voice message 200 may be stored in data storage 110. The address portion may also be stored along with the voice portion.

In step 306, server 112 uses the address portion to determine the address of each phone in the group of phones. The address portion may include the actual address of each phone, or information that is associated with the address of each phone. For example, in one embodiment the address portion of voice message 200 includes an address associated with a group of phones. The actual address of each phone is stored in data storage 110. In this embodiment, server 112 retrieves the actual address of each phone from data storage 110. The actual address of each phone may also be stored in memory of server 112.

In step 308, server 112 attempts to establish a connection with each phone in the group of phones. In some embodiments, server 112 communicates through switch 118, and switch 118 attempts to establish the connection with each phone. If a phone is not being used, the connection will normally be established. However, if a phone is in use, it may not be possible to establish a connection with that phone.

In step 310, server 112 waits for a period of time, where the period of time is determined based at least in part on a time duration required to establish a connection with a phone. Waiting ensures that the phones are ready to play the message when it is received. This avoids delays that result from different connection times. The period of time may depend on the hardware used in VoIP system 100 and the phones to which voice message 200 is being sent. For example, it typically takes longer to establish a connection with analog phone 116 and the communications devices linked with PSTN 122 than IP phone 106, soft phone 108, or overhead paging system 104.

In some embodiments, the period of time may be a set time period. As an example, the set time period may be determined as the average time period required to establish a connection with each phone in a typical group of phones. Here, the set time period will likely vary depending on the hardware used in VoIP system 100 and the communications devices in a typical group. Alternatively, the set time period may be determined as the maximum time period required to establish a connection with each phone in a typical group of phones, or some time duration longer than the average time period or the maximum time period. The set time period may be a fraction of a second, a second, three seconds, six seconds, or whatever time period is determined based at least in part on the time duration required to establish a connection with a phone.

In other embodiments, the period of time may be the time delay required to establish a connection with each phone in the group. Here, the voice message may be sent to the phones immediately upon establishing a connection with each phone. In yet other embodiments, the period of time may be the time it takes to establish a connection with each phone, unless the connection with each phone is not established within a set time period, in which case the period of time is the set time period.

In step 312, server 112 sends the voice portion of voice message 200 to at least one phone in the group of phones. The voice portion is encoded in packets and routed across network 114. The voice portion may include the address of the phone to which the voice portion is being sent. As mentioned previously, the group of phones may include devices that are part of VoIP system 100 and/or devices that are linked to PSTN 122.

In some embodiments of the present invention, the voice portion is sent to all phones in the group. The phones in the group that that do not have an established connection may store the message for later playback. Alternatively, the voice portion may be sent only to those phones in the group with an established connection. In yet other embodiments, the voice portion may be broadcast to all phones in VoIP system 100. In this case, each phone in VoIP system 100 with an established connection plays voice message 200.

In other embodiments, data storage 110 maintains information related to the geographic location of each phone in VoIP system 100. Server 112 accesses this information and determines if a subset of phones with established connections are in close physical proximity to each other and are in the group of phones to which voice message 200 is being sent. In this case, server 112 may send the voice portion of voice message 200 to the subset of phones while waiting for the connections to be established with the remaining phones. The voice portion of voice message 200 is sent to the remaining phones either after the connections are established or after a set period of time has elapsed.

Figure 4:
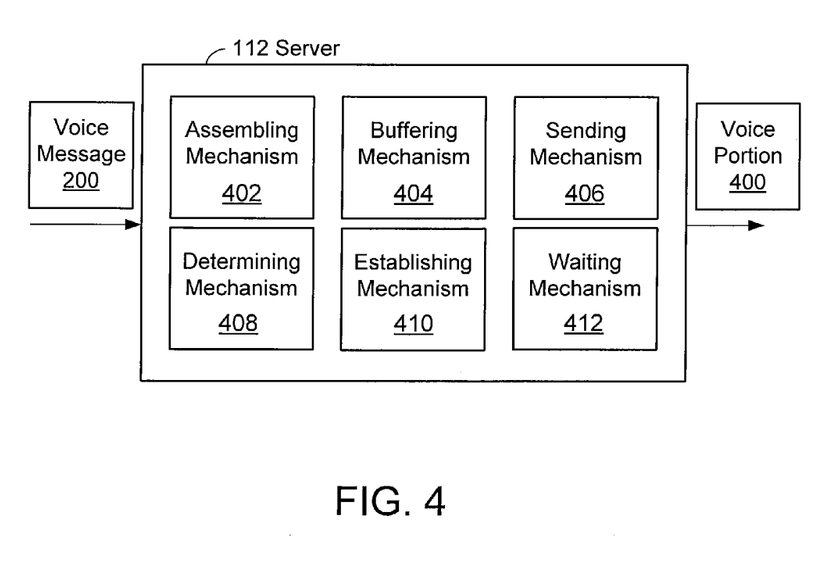
FIG. 4 illustrates a block diagram of a server architecture according to an embodiment of the present invention.

FIG. 4 illustrates a block diagram of a server architecture according to an embodiment of the present invention. FIG. 4 shows voice message 200 which, as explained previously, is encoded in packets and routed across network 114 to server 112. Server 112 includes an assembling mechanism 402 to assemble at least a portion of voice message 200. Server 112 includes a buffering mechanism 404 for buffering the voice portion of voice message 200 in a digital buffer. Server 112 includes a determining mechanism 408 for determining the address of each phone in the group of phones. Server 112 includes an establishing mechanism 410 for attempting to establish a connection with each phone in the group. Server 112 includes a waiting mechanism 412 for waiting for a period of time. The period of time is determined based at least in part on a time duration required to establish a connection with a phone. Server 112 includes a sending mechanism 406 for sending the voice portion 400 of voice message 200 to the group of phones. Each of the preceding mechanisms may be embodied in hardware, as a set of instructions embodied as code on a computer readable medium, as a set of instructions embodied as code in server 112 memory, as a set of instructions embodied within an application specific integrated circuit, and/or other embodiments.

While the present invention has been described in terms of specific embodiments, it should be apparent to those skilled in the art that the scope of the present invention is not limited to the embodiments described herein. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for sending a virtual real time voice message processed through a VOIP system to a group of phones concurrently, the method comprising:
   (a) assembling at least a portion of the voice message, the voice message including a voice portion and an address portion;
   (b) buffering the voice portion of the voice message in a digital buffer;
   (c) determining an address of each phone in the group of phones, the address of each phone being associated with the address portion of the voice message; thereafter
   (d) attempting to establish a separate connection with each phone in the group of phones;
   (e) establishing separate connections with at least a portion of those phones in the group of phones; thereafter
   (f) waiting a period of time, wherein the period of time is determined based at least in part on a time duration required to establish a connection with a phone, the period of time being a set time period having a duration that extends after the separate connections have been established with the portion of those phones in the group of phones; and
   (g) upon expiration of the set time period, sending the voice portion of the voice message concurrently to those phones in the group of phones with which the separate connections have been established.

2. A method for sending a virtual real time voice message processed through a VOIP system to a group of phones concurrently, the method comprising:
   (a) assembling at least a portion of the voice message, the voice message including a voice portion and an address portion;
   (b) buffering the voice portion of the voice message in a digital buffer;
   (c) determining an address of each phone in the group of phones, the address of each phone being associated with the address portion of the voice message; thereafter
   (d) attempting to establish a separate connection with each phone in the group of phones;
   (e) establishing separate connections with at least a portion of those phones in the group of phones; thereafter
   (f) waiting a period of time, wherein the period of time is determined based at least in part on a time duration required to establish a connection with a phone, the period of time being a time delay required to establish the separate connections with the portion of those phones in the group of phones; and (g) upon establishing the separate connections with the portion of those phones in the group of phones, sending the voice portion of the voice message concurrently to those phones in the group of phones with which the separate connections have been established.

3. The method of claim 2 wherein if the separate connection with each phone in the group of phones is not established within a set time period, the period of time is the set time period.

4. The method of claim 1 wherein the voice portion of the voice message is sent to each phone in the group of phones.

5. The method of claim 4 wherein the voice portion of the voice message is stored by phones in the group of phones with which the separate connection has not been established.

6. An apparatus in a VOIP system capable of sending a virtual real time voice message processed through the VOIP system to a group of phones concurrently, comprising:

(a) an assembling mechanism configured to assemble at least a portion of the voice message, the voice message including a voice portion and an address portion;

(b) a buffering mechanism configured to buffer the voice portion of the voice message in a digital buffer;

(c) a determining mechanism configured to determine an address of each phone in the group of phones, the address of each phone being associated with the address portion of the voice message;

(d) an establishing mechanism configured to attempt to establish a separate connection with each phone in the group of phones, the establishing mechanism also configured to establish separate connections with at least a portion of those phones in the group of phones;

(e) a waiting mechanism configured to wait a period of time after the separate connections with the portion of those phones in the group of phones have been established, wherein the period of time is determined based at least in part on a time duration required to establish a connection with a phone, the period of time being a set time period having a duration that extends after the separate connections have been established with the portion of those phones in the group of phones; and (f) a sending mechanism configured to send the voice portion of the voice message concurrently to those phones in the group of phones with which the separate connections have been established upon expiration of the set time period.

7. An apparatus in a VOIP system capable of sending a virtual real time voice message processed through the VOIP system to a group of phones concurrently, comprising:

(a) an assembling mechanism configured to assemble at least a portion of the voice message, the voice message including a voice portion and an address portion;

(b) a buffering mechanism configured to buffer the voice portion of the voice message in a digital buffer;

(c) a determining mechanism configured to determine an address of each phone in the group of phones, the address of each phone being associated with the address portion of the voice message;

(d) an establishing mechanism configured to attempt to establish a separate connection with each phone in the group of phones, the establishing mechanism also configured to establish separate connections with at least a portion of those phones in the group of phones;

(e) a waiting mechanism configured to wait a period of time after the separate connections with the portion of those phones in the group of phones have been established, wherein the period of time is determined based at least in part on a time duration required to establish a connection with a phone, the period of time being a time delay required to establish the separate connections with the portion of those phones in the group of phones; and (f) a sending mechanism configured to send the voice portion of the voice message concurrently to those phones in the group of phones with which the separate connection has been established.

8. The apparatus of claim 7 wherein if the separate connection with each phone in the group of phones is not established within a set time period, the period of time is the set time period.

9. The apparatus of claim 6 wherein the voice portion of the voice message is sent to each phone in the group of phones.

10. A non-transitory computer readable medium including computer program code for sending a virtual real time voice message processed through a VOIP system to a group of phones concurrently, the computer readable medium comprising:

(a) code for assembling at least a portion of the voice message, the voice message including a voice portion and an address portion;

(b) code for buffering the voice portion of the voice message in a digital buffer;

(c) code for determining an address of each phone in the group of phones, the address of each phone being associated with the address portion of the voice message;

(d) code for attempting to establish a separate connection with each phone in the group of phones;

(e) code for establishing separate connections with at least a portion of those phones in the group of phones;

(f) code for waiting a period of time after the separate connections with the portion of those phones in the group of phones have been established, wherein the period of time is determined based at least in part on a time duration required to establish a connection with a phone, the period of time being a set time period having a duration that extends after the separate connections have been established with the portion of those phones in the group of phones; and (g) code for sending the voice portion of the voice message concurrently to those phones in the group of phones with which the separate connections have been established upon expiration of the set time period.

11. A non-transitory computer readable medium including computer program code for sending a virtual real time voice message processed through a VOIP system to a group of phones concurrently, the computer readable medium comprising:

(a) code for assembling at least a portion of the voice message, the voice message including a voice portion and an address portion;

(b) code for buffering the voice portion of the voice message in a digital buffer;

(c) code for determining an address of each phone in the group of phones, the address of each phone being associated with the address portion of the voice message;

(d) code for attempting to establish a separate connection with each phone in the group of phones;

(e) code for establishing separate connections with at least a portion of those phones in the group of phones;

(f) code for waiting a period of time after the separate connections with the portion of those phones in the group of phones have been established, wherein the period of time is determined based at least in part on a time duration required to establish a connection with a phone, the period of time being a time delay required to establish the separate connections with the portion of those phones in the group of phones; and (g) code for sending the voice portion of the voice message concurrently to those phones in the group of phones with which the separate connection has been established.

12. The non-transitory computer readable medium of claim 11 wherein if the separate connection with each phone in the group of phones is not established within a set time period, the period of time is the set time period.

13. The non-transitory computer readable medium of claim 10 wherein the voice portion of the voice message is sent to each phone in the group of phones.

14. The non-transitory computer readable medium of claim 13 wherein the voice portion of the voice message is stored by phones in the group of phones with which the separate connection has not been established.

15. The method of claim 1 wherein the period of time is a set time period having a duration that expires before the separate connection has been established with each phone in the group of phones.

16. The method of claim 6 wherein the period of time is a set time period having a duration that expires before the separate connection has been established with each phone in the group of phones.

17. The method of claim 10 wherein the period of time is a set time period having a duration that expires before the separate connection has been established with each phone in the group of phones.

18. The method of claim 2 wherein the voice portion of the voice message is sent to each phone in the group of phones.

19. The method of claim 18 wherein the voice portion of the voice message is stored by phones in the group of phones with which the separate connection has not been established.

20. The apparatus of claim 7 wherein the voice portion of the voice message is sent to each phone in the group of phones.

21. The non-transitory computer readable medium of claim 11 wherein the voice portion of the voice message is sent to each phone in the group of phones.

22. The non-transitory computer readable medium of claim 11 wherein the voice portion of the voice message is stored by phones in the group of phones with which the separate connection has not been established.

* * * * *